United States Patent [19]

Morrison

[11] 4,412,805

[45] Nov. 1, 1983

[54] HOT SPRUE ASSEMBLY FOR AN INJECTION MOLDING MACHINE

[75] Inventor: Rocky V. Morrison, Redondo Beach, Calif.

[73] Assignee: Discovision Associates, Costa Mesa, Calif.

[21] Appl. No.: 304,422

[22] Filed: Sep. 23, 1981

Related U.S. Application Data

[63] Continuation-in-part of Ser. No. 272,432, Jun. 10, 1981, abandoned.

[51] Int. Cl.$^3$ .............................................. B29F 1/03
[52] U.S. Cl. .................................. 425/549; 425/568; 425/573; 425/810
[58] Field of Search ............... 425/548, 549, 568, 573, 425/810

[56]  References Cited

U.S. PATENT DOCUMENTS

| | | | |
|---|---|---|---|
| 4,279,588 | 7/1981 | Gellert | 425/549 X |
| 4,290,744 | 9/1981 | Dannels | 425/549 X |
| 4,304,544 | 12/1981 | Crandell | 425/549 |
| 4,340,353 | 7/1982 | Mayer | 425/549 X |
| 4,344,750 | 8/1982 | Gellert | 425/549 X |
| 4,345,892 | 8/1982 | Schulte | 425/549 X |

Primary Examiner—Thomas P. Pavelko

[57] ABSTRACT

A hot sprue assembly is provided for controlling flow of molten material into the mold cavity of an injection molding machine. The hot sprue assembly is particularly designed for use with an injection molding machine for molding centrally apertured record discs, such as video information discs. The hot sprue assembly includes a hot sprue bushing cooperating with a dispersion head to define an open and relatively narrow annular gate through which molten material is injected into the mold cavity, and a central die plug within the mold cavity for cooperating with the dispersion head to mold a central aperture into the disc. Valving of the molten material through the gate is achieved by heating the sprue assembly to create a temperature differential which, during solidification of the material within the mold cavity, permits the material within the mold cavity to solidify up to the gate without substantial solidification of material within the sprue assembly. The gate is disposed at a plane recessed slighty from the general plane of the solidified disc to prevent any surface discontinuities arising by retraction of the sprue assembly when the mold cavity is opened from projecting above the general plane of the disc.

36 Claims, 6 Drawing Figures

HOT SPRUE ASSEMBLY FOR AN INJECTION MOLDING MACHINE

BACKGROUND OF THE INVENTION

This is a continuation-in-part of copending U.S. application Ser. No. 272,432, filed June 10, 1981, now abandoned.

This invention relates generally to injection molding machines, and more particularly, to injection molding machines including means for controlling flow of molten material into a mold cavity of a machine molding assembly designed for molding a centrally apertured record disc, such as a video information disc, and for molding a central aperture into such disc.

An example of an injection molding machine of this general type is disclosed in copending and commonly assigned patent applications U.S. Ser. No. 847,367, filed in the name of J. R. Holmes et al., and entitled "METHOD AND MEANS FOR REPLICATING CENTRALLY APERTURED VIDEO DISC RECORDS", and U.S. Ser. No. 031,205, filed in the name of J. R. Holmes, and entitled "MOLDING APPARATUS FOR PRODUCING CENTRALLY APERTURED RECORD DISCS". The machines described in these applications comprise injection molding machines having a molding assembly with first and second mold halves reciprocally movable between a closed position defining an annular mold cavity into which molten disc-forming material of plastic or the like is injected to form a video information disc, and an open position wherein the mold cavity is opened and the resultant molded video information disc is removed from the machine. The mold cavity is lined by one or more disc-shaped stamping dies carried by the mold halves, and these stamping dies include surface geometries representative of the information to be formed on the disc.

In injection molding machines of this general type, it is well known to inject molten plastic material under pressure from an injector gun assembly through a hot spure bushing and into the mold cavity. When the mold cavity is filled with the molten plastic material, the surrounding machine structure including the respective mold halves, the stamping dies, and the hot sprue bushing are commonly cooled by a circulating liquid coolant to reduce the temperature of the molten plastic material and thereby solidify the material. After solidification, the hardened information disc is removed from the machine and the cycle is restarted, thereby allowing a relatively rapid production rate of the information discs. However, the plastic material within the sprue bushing typically has a relatively large thickness compared with the plastic material within the mold cavity, whereby the plastic material within the sprue bushing takes the longest time to solidify. The cycle time for molding the information discs in machines of this type therefore tends to be dependent upon the longer cooling time of the material within the sprue bushing, and not upon the shorter cooling time of the material within the mold cavity. Moreover, this material within the sprue bushing when solidified comprises wasted plastic material which must be removed from the molded information disc, typically by means of a punch assembly or the like which simultaneously forms a central aperture in the disc to permit the disc to be placed upon the spindle of an appropriate playback machine.

Formation of the central aperture by means of the conventional punch assembly as disclosed generally in the above-referenced copending patent applications poses a variety of problems in the production of the information discs. For example, the punching step requires a certain cycle time to perform, thereby undesirably prolonging the cycle time for each information disc. Moreover, the use of the punch assembly results in an aperture shape having a concentricity dependent upon the state of wear of the punch die. As punch die wear progresses with deteriorating concentricity, the likelihood of the creation of debris in the vicinity of the aperture increases, and such debris can deleteriously affect the quality of a subsequently molded information disc. Finally, the use of a punch assembly places the information disc under substantial stress which can crack an otherwise acceptable disc in the region of the central aperture, resulting in rejection of the disc as scrap.

Some devices have been proposed to mold the central aperture into the information disc prior to solidification of the disc-forming material and thereby avoid use of a punch assembly. See, for example, copending and commonly assigned U.S. application Ser. No. 202,824, filed in the name of A. Cane et al., and entitled "HOT SPRUE VALVE ASSEMBLY FOR AN INJECTION MOLDING MACHINE" which discloses a valve member movable across the mold cavity into engagement with the sprue bushing to mold the central aperture into the disc while controlling flow of molten material into the mold cavity. See also, for example, copending and commonly assigned U.S. application Ser. No. 202,838, filed in the name of B. F. P. Mayer, and entitled "HOT SPRUE VALVE ASSEMBLY FOR AN INJECTION MOLDING MACHINE" which discloses a poppet valve structure movable through the mold cavity and engageable with the sprue bushing to mold a central aperture into the disc while controlling flow of molten material into the mold cavity. By way of further example, see copending and commonly assigned U.S. application Ser. No. 272,431, filed in the name of A. Taylor, and entitled "HOT SPRUE VALVE ASSEMBLY FOR AN INJECTION MOLDING MACHINE" which discloses a sleeve-type valve cooperating with a sprue bushing to mold a central aperture into a record disc while controlling flow of molten material into the mold cavity. In all of these designs, however, relatively complex and expensive movable valve members and associated actuation devices are required to provide the controlled movement of the valve member with respect to the sprue bushing.

The present invention constitutes a substantial improvement over prior hot sprue valve assemblies by providing an improved hot sprue assembly wherein controlled flow of molten material into the mold cavity is achieved in the absence of movable valve members and associated actuation devices, and wherein a central aperture is molded directly into an information disc prior to solidification of disc-forming material.

SUMMARY OF THE INVENTION

The present invention is embodied in an improved injection molding machine for use in producing centrally apertured record discs, such as video information discs. The machine includes a molding assembly having first and second mold halves reciprocally movable with respect to each other between a closed position defining an annular mold cavity into which molten disc-forming material, such as a molten plastic material, is injected to form the disc, and an open position wherein the mold is opened and the molded disc can be extracted from the machine. At least one surface of the annular mold cavity is defined by a planar, disc-shaped stamping die carried by one of the two mold halves for use in imparting appropriate information to the surface of the molded disc.

According to one preferred form of the invention, the molding assembly for the machine includes an improved hot sprue assembly having a hot sprue bushing defining a central bore for passage of the molten disc-forming material at an elevated temperature from an injector gun assembly toward the mold cavity. The sprue bushing bore opens into a generally conically-shaped recess adjacent the mold cavity for reception of a generally conically-shaped dispersion head secured to the sprue bushing. The sprue bushing and the dispersion head together define an annular flow path of expanding diameter extending axially toward the mold cavity and radially outwardly with respect to a central axis of the mold cavity. This flow path terminates at an open annular gate within a shallow annular boss formed by the sprue bushing and the dispersion head wherein the gate is positioned on a plane recessed slightly from the general plane of the information disc to be molded. The gate has a relatively narrow radial width, such as on the order of about 0.005 to about 0.020 inch, through which the molten material is extruded into the mold cavity. This material enters the mold cavity generally concentrically about a cylindrical die plug disposed within the mold cavity for cooperating with the dispersion head, when the mold halves are closed, to mold a central aperture into the information disc.

The hot sprue assembly includes heater means for maintaining and controlling the temperature of molten material passing through the sprue assembly toward the mold cavity. The heater means is controlled to maintain the material in a molten, flowable state as it passes through the sprue assembly and into the mold cavity during an injection stage of machine operation. The specific heat input is chosen to provide a controlled temperature gradient between the sprue assembly and the mold cavity during a cooling stage of machine operation for solidification of the material within the mold cavity without substantial solidification of the molten material within the sprue assembly, particularly in the vicinity of the gate. More specifically, the temperature gradient is selected for solidification of the material within the mold cavity up to the gate such that the boundary between solid and liquid states of the material is located substantially at the gate when the mold halves are separated to open the mold cavity for extraction of the solifified disc. The narrow gate width permits easy separation of the solidified disc from material within the sprue assembly without substantial disruption of the disc surface. To the extent that separation results in the formation of surface discontinuities on the solidifed disc, such discontinuities are positioned below the general plane of the disc where they will not impair normal disc use.

The material within the sprue assembly in the vicinity of the gate cools to a temperature at least near solidification temperature whereby the viscosity of this material increases sufficiently to prevent material from drooling through the gate when the mold halves are separated from each other. A thin film of this material may even solidify to seal the gate against passage of drooling material. Upon subsequent closure of the mold halves and subsequent operation of the injector gun assembly to once again fill the mold cavity, this material in the vicinity of the gate is forced under injection pressure into the mold cavity where it is remelted and rehomogenized with the remainder of the injected material prior to cooling of the material to form a subsequent solidified information disc.

According to an alternative preferred form of the invention, the hot sprue bushing includes a bore which opens into a conically expanding chamber which in turn merges with a generally cylindrical chamber extending toward the mold cavity. A modified dispersion head assembly is secured to the bushing and includes a dispersion head having an upper conical portion projecting into the conical chamber to define a relatively short annular flow path of expanding diameter. This expanding flow path opens axially into an annular flow path between a lower cylindrical portion of the dispersion head and an extrusion sleeve having a plurality of relatively small extrusion passages through which the molten material is extruded into a second or outer annular flow path. This second annular flow path opens axialy into the mold cavity through a relatively narrow, annular gate preferably having the same geometry as the gate described above with respect to the previous embodiment of the invention.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
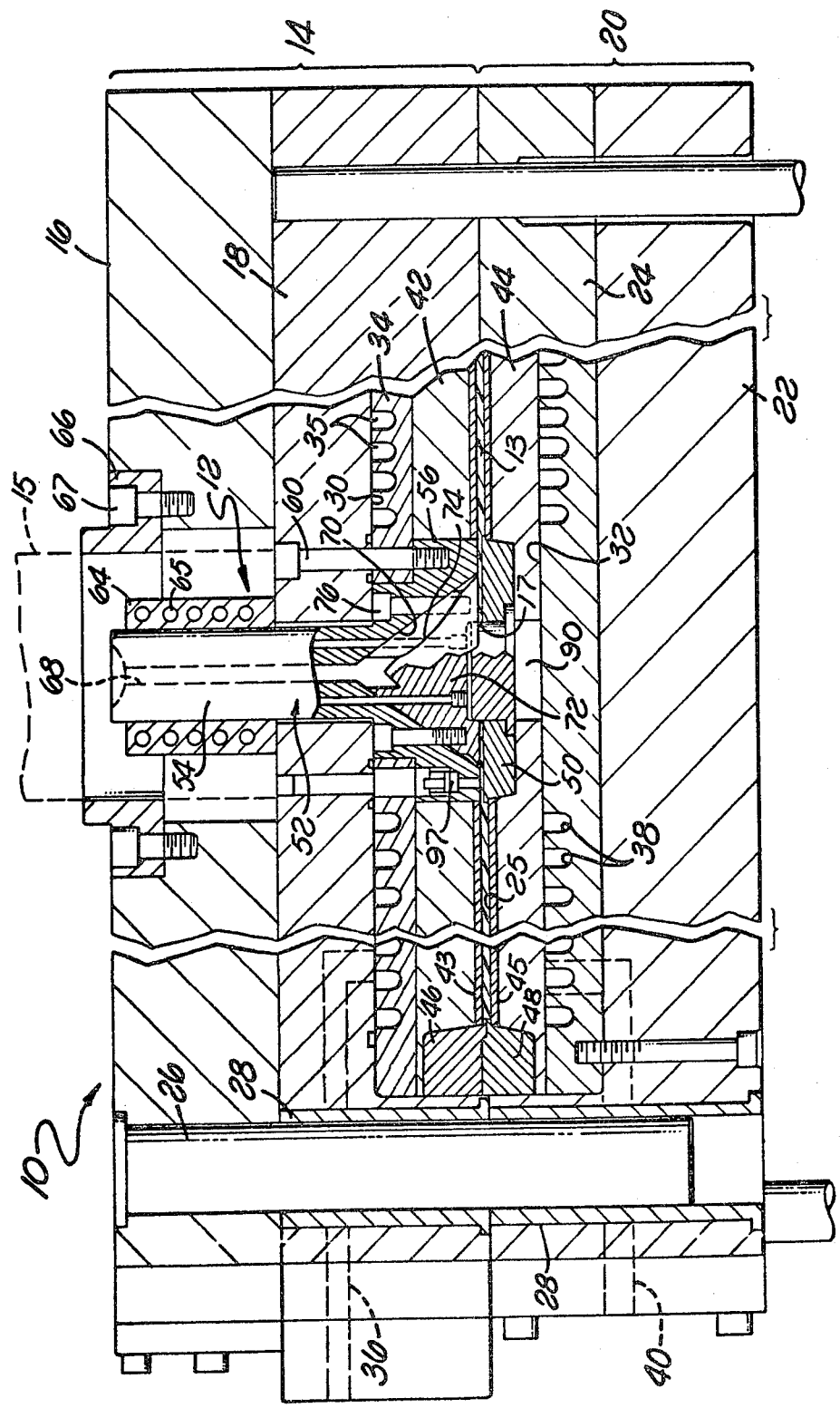
FIG. 1 is a simplified cross-sectional view of an injection molding machine including a hot sprue assembly embodying the novel features of this invention.

Referring now to the drawings, and particularly to FIG. 1, there is shown a molding apparatus 10 for use in combination with an injection molding machine (not shown) The molding apparatus 10 includes a hot sprue assembly 12 embodying the novel features of this invention to produce a centrally apertured record disc, such as a video information disc 13. One suitable molding machine in which the molding apparatus 10 can be used comprises a 375 ton model manufactured by the Stokes Division of Pennwalt Manufacturing Co.

The molding apparatus 10 comprises a first mold half 14 including a base plate 16 and a carrier plate 18, and a second mold half 20 including a base plate 22 and a carrier plate 24. The first and second mold halves 14 and 20, along with their associated base and carrier plates 16, 18, and 22, 24 are reciprocally movable toward and away from each other to open and close a relatively thin, substantially planar mold cavity 25 in which the information disc 13 is molded. More specifically, the mold halves 14 and 20 are movable between a closed position with their carrier plates 18 and 24 in abutting relation with each other to define the mold cavity 25, as shown in FIG. 1, and an open position with the carrier plates 18 and 24 retracted or separated from each other (not shown). A plurality of guide pins 26, one of which is shown in FIG. 1, are secured to the first mold half 14 and slidably received within bushings 28 in the carrier plate 18 and the second mold half 20 to maintain the two mold halves in a desired axial alignment with each other.

The carrier plates 18 and 24 of the two mold halves 14 and 20 respectively include annular plate-shaped recesses 30 and 32 facing toward each other generally in axial alignment. As illustrated, the upper carrier plate 18 receives within the recess 30 an annular support plate 34 having a plurality of flow passages 35 formed therein for circulation of a suitable liquid coolant supplied through an inlet 36. Similar coolant flow passages 38 are formed in the lower carrier plate 24 for circulation of a liquid coolant supplied via a lower inlet 40. The support plate 34 and the lower carrier plate 24 in turn respectively carry annular platens 42 and 44 which can be secured in position in a suitable manner such as by bolts or the like (not shown).

The annular platens 42 and 44 respectively carry annular disc-shaped stamping dies 43 and 45, wherein at least one of the dies has a surface configuration representative of the information to be cast into the molded information disc. These stamping dies cooperate with each other, when the mold halves 14 and 20 are in the closed position, to define the disc-shaped mold cavity 25. Annular clamping rings 46 and 48 can be provided about the circumference of the mold cavity 25 for securing the stamping dies 43 and 45 in fixed positions to their respective platens 42 and 44, all in a well-known manner. If desired, annular center clamps can also be provided for securing the stamping dies in position, such as the lower clamp 50 shown in FIG. 1. The specific construction and operation of these various components is discussed in further detail in copending and commonly assigned U.S. application Ser. No. 031,205, filed Apr. 18, 1979, by John R. Holmes and entitled "APPARATUS FOR PRODUCING CENTRALLY APERTURED RECORD DISCS", the disclosure of which is incorporated herein by reference.

The hot sprue assembly 12 of this invention is secured to the first mold half 14 for controlled passage of a suitable molten disc-forming material, such as a molten plastic material, under pressure from an injector gun assembly into the mold cavity 25. More specifically, the injector gun assembly has a construction generally conventional in the art for supplying the disc-forming material in a heated, flowable molten state in an appropriate quantity and under an appropriate pressure through an assembly nozzle 15 to the hot sprue assembly 12. The hot sprue assembly 12 guides the molten material through the base plate 16 and the carrier plate 18 of the first mold half 14 for admission or injection into the disc-shaped mold cavity 25. The material enters and fills the mold cavity where it assumes the shape of the desired information disc 13 and is solidified or frozen by cooling of the material upon circulation of liquid coolant through the flow passages 35 and 38. Importantly, the hot sprue assembly 12 of this invention is designed to create and accurately control a temperature gradient between the sprue assembly and the mold cavity 25 during this cooling stage to permit material within the mold cavity to solidify without substantial solidification of the material within the sprue assembly. Moreover, the sprue assembly includes simplified apparatus for molding a central aperture 17 of a desired size and shape into the information disc 13 prior to solidification of the disc-forming material.

Figure 2:
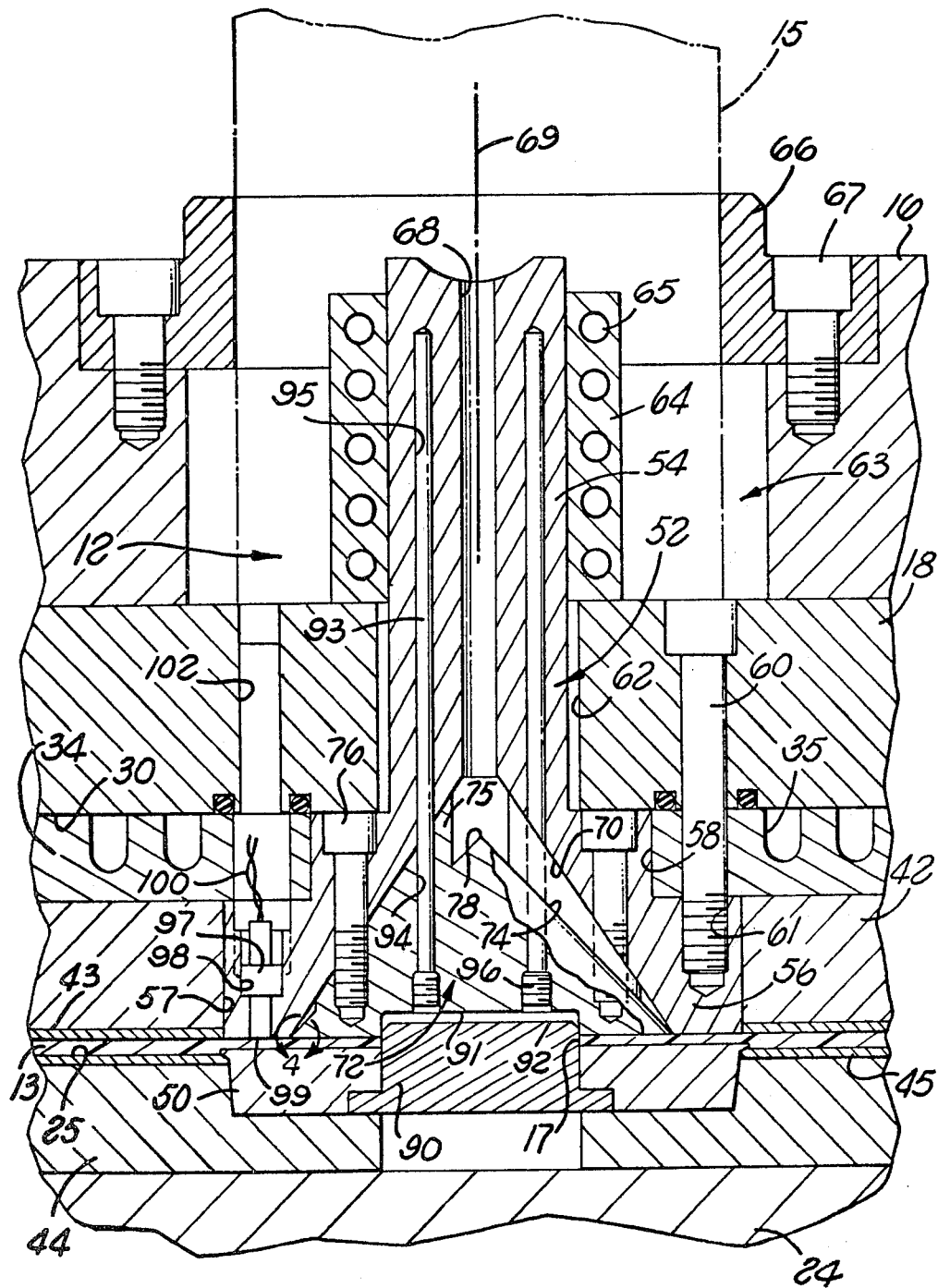
FIG. 2 is an enlarged fragmented cross-sectional view illustrating one preferred form of the hot sprue assembly of this invention.
Figure 3:
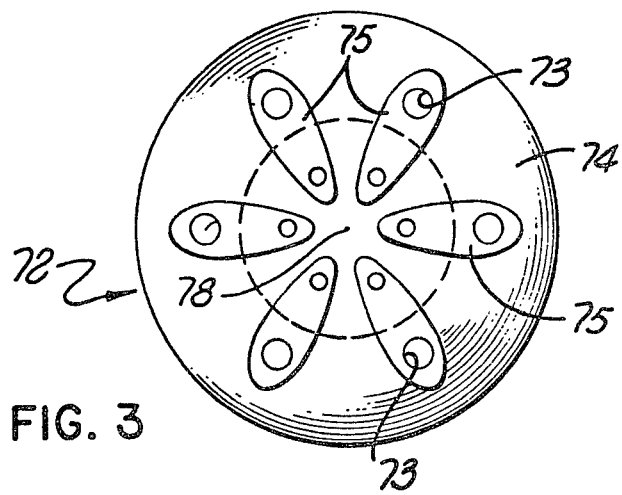
FIG. 3 is a top plan view of one portion of the hot sprue assembly.
Figure 4:
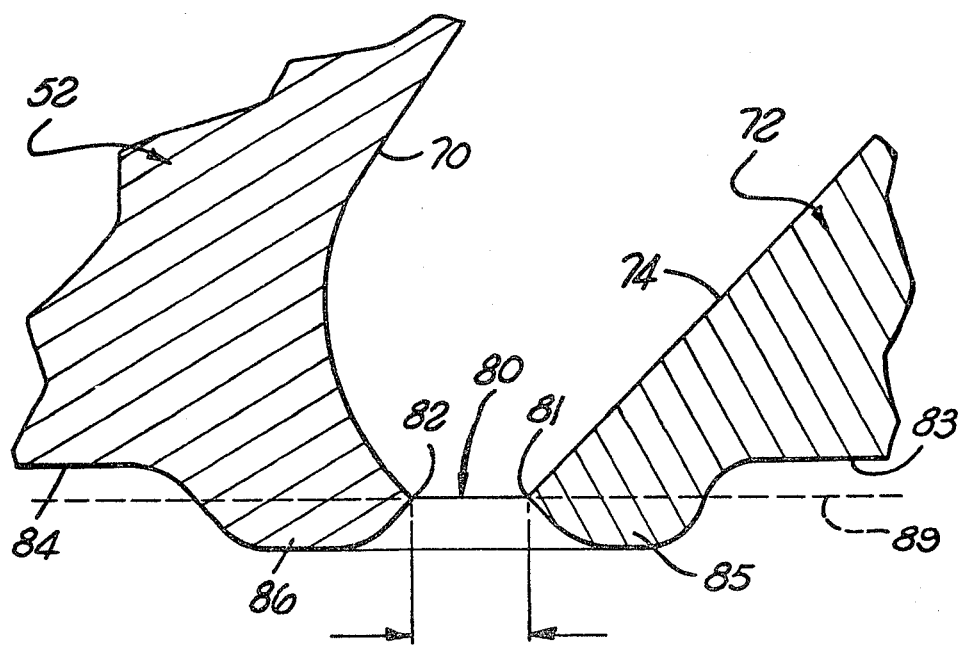
FIG. 4 is an enlarged fragmented cross-sectional view corresponding to the reference circle "4" in FIG. 2, and illustrating in detail a portion of the hot sprue assembly.

The hot sprue assembly 12 of this invention, according to one preferred form thereof, is illustrated in detail in FIGS. 2–4. As shown best in FIG. 2, the sprue assembly 12 comprises a sprue bushing 52 formed from a suitable rigid material such as tool steel or the like to have an elongated cylindrical upper shank 54 received by the nozzle 15 of the injector gun assembly and a radially enlarged lower mounting block 56 secured to the first mold half 14. More specifically, the mounting block 56 is sized for reception within matingly shaped openings 57 and 58 of the upper platen 42 and the support plate 34. A plurality of mounting screws 60, one of which is shown in FIGS. 1 and 2, and received downwardly through the carrier plate 18 and fastened into threaded openings 61 in the mounting block 56 to secure the sprue bushing 52 rigidly upon the first mold half.

The upper shank 54 of the sprue bushing 52 projects upwardly from the mounting block 56 through a central opening 62 in the carrier plate 18 and into an enlarged chamber 63 formed within the base plate 16. A heater device 64, such as a ceramic clamping collar encasing an electrical resistance heater coil 65, is positioned within this chamber 63 about the upper end of the shank 54 and is coupled in an appropriate manner (not shown) to a source of electrical energy for elevating the temperature of the shank. The nozzle 15 of the injector gun assembly is fitted over the heater device 64 and the upper end of the shank 54 to supply the molten disc-forming material to the sprue bushing. Conveniently, as illustrated, the nozzle 15 is secured in position by a retaining ring 66 fastened to the base plate 16 as by screws 67.

In operation, the injector gun assembly supplies molten disc-forming material at an appropriate temperature and pressure to the upper end of the sprue bushing 52. This molten material is directed into a central bore 68 in the sprue bushing shank 54 for flow in a downward direction, as viewed in FIG. 2, toward the mold cavity 25 generally along a central axis 69 of the mold cavity. At the lower end of the sprue bushing shank 54, the bore 68 blends into an enlarged and downwardly open conical recess or chamber defined by a downwardly diverging conical face 70 within the sprue bushing mounting block 56. As illustrated, this conical face 70 extends from the bore 68 axially downwardly toward the mold cavity and radially outwardly with respect to the cavity central axis 69.

A dispersion head 72 is secured to the sprue bushing within the conical chamber and cooperates with the sprue bushing conical face 70 to guide the molten material from the bore 68 toward the mold cavity 25 with substantially uniform radial distribution. More specifically, as viewed in FIGS. 2 and 3, the dispersion head 72 is shaped to have a conical face 74 presented in an upward direction toward the conical face 70 of the sprue bushing. A circumferentially arranged plurality of spacer flights 75 project upwardly from the dispersion head conical face 74 into mating abutting engagement with the sprue bushing conical face 70 to maintain the faces 70 and 74 in vertically spaced relation to each other, and thereby define an annular flow path for the molten material. Conveniently, these spacer flights also include vertically extending openings 73 for passage of connecting screws 76 downwardly from the mounting block 56 into threaded engagement with the dispersion head 72 for securely mounting the dispersion head on the sprue bushing. Accordingly, the dispersion head 72 remains in a fixed position with respect to the sprue bushing 52 upon opening and closing of the mold halves 14 and 20 during production, as will be described in more detail.

The upper ends of the spacer flights 75 are shaped to matingly engage the sprue bushing conical face 70 for accurate alignment of the dispersion head apex 78 along the central axis 69 of the mold cavity. In this position, the aligned apex 78 of the dispersion head 72 divides the molten material passing from the bore 68 into a substantially uniform annular flow stream for passage between the conical faces 70 and 74 toward the mold cavity. This annular flow stream of material is further divided by the circumferentially arranged spacer flights 75, six of which are illustrated in FIG. 3, into a radially arranged plurality of smaller flow streams which tends to enhance further the uniformity of radial distribution of the material. Importantly, the spacer flights 75 are configured with smoothly contoured cross-sectional shapes for smooth flow of the material downwardly and radially outwardly toward the mold cavity. The lower, radially outer edges of the spacer flights 75 terminate slightly short of the mold cavity to permit the smaller flow streams to reunite into a single homogeneous flow stream prior to injection into the mold cavity.

The conical faces 70 and 74 of the sprue bushing 52 and the dispersion head 72 may be angularly disposed with respect to each other, as viewed in FIG. 2, to converge vertically toward each other from the bore 68 to the mold cavity 25. With this construction, the molten material tends to be accelerated as it flows toward the mold cavity resulting in increased frictional resistance to material flow and a corresponding increase in material homogeneity and temperature. This helps to prevent premature solidification of any portion of the material and assists in a more thorough recombining of the smaller flow streams into one homogeneous annular flow with substantially uniform radial distribution prior to injection into the mold cavity. Moreover, this configuration minimizes the total volume of material in close proximity with the mold cavity and thereby minimizes the potential for material solidification between the adjacent conical faces 70 and 74.

The dispersion head 72 cooperates with the sprue bushing 52 to form an annular opening, or gate 80, for passage of the molten material into the mold cavity 25. This annular gate 80 is defined by the geometric contouring of the lower, peripheral edges of the two conical faces 74 and 70, as illustrated in detail in FIG. 4. Importantly, according to the invention, the sprue bushing 52 and the dispersion head 72 are fixed with respect to each other such that the annular gate 80 is open during all conditions of machine operation. Control of material flow through the gate 80 is achieved by control of material temperature and pressure during machine operation to permit the omission of moving valve members to open and close the gate.

As shown in FIG. 4, the conical face 74 of the dispersion head 72 extends axially downwardly and radially outwardly toward the mold cavity 25 and terminates as a radially outwardly presented, relatively sharp edge 81 forming the inner diameter of the gate 80. Similarly, the conical face 70 of the sprue bushing extends axially downwardly and radially outwardly toward the mold cavity, but the lower extent of this conical face 70 is contoured to curve radially inwardly toward the dispersion head and terminates in a radially inwardly presented, relatively sharp edge 82 forming the outer diameter of the gate 80. The edges 81 and 82 are closely spaced from each other to provide a narrow, annularly open passage for flow of the molten material into the mold cavity. In a typical operating environment, the radial spacing between the edges 81 and 82 is chosen to be on the order of about 0.005 to about 0.020 inch.

The gate 80 is positioned in a plane recessed slightly into the mold cavity 25. More specifically, the upper plane of the mold cavity 25 and thus the upper general plane of the information disc 13 is defined by the upper stamping die 43 and by the lower faces 83 and 84, respectively, of the dispersion head 72 and the sprue bushing 52. However, adjacent the gate 80, the dispersion head 72 and the sprue bushing 52 respectively include narrow annular projections 85 and 86 depending from the faces 83 and 84 slightly into the mold cavity 25. These projections cooperate with each other to form a narrow annular boss extending downwardly into the mold cavity a short distance, such as on the order of about 0.005 inch, and having a narrow overall radial width, such as on the order of about 0.030 inch. Importantly, these projections 85 and 86 define the edges 81 and 82 of the gate wherein these edges are disposed in a plane 89 recessed at least a few thousandths of an inch below the upper general plane of the information disc. From the edges 81 and 82, the projections 85 and 86 are contoured to sweep downwardly respectively in generally radially inward and generally radially outward directions to guide molten material smoothly into the mold cavity.

The molding apparatus 10 is operated by closing the two mold halves 14 and 20 to define the mold cavity 25. The sprue assembly 12 including the sprue bushing 52 and the dispersion head 72 is carried by the first mold half 14 to the closed position, as viewed in FIGS. 1 and 2. During this movement, the dispersion head 72 is aligned with respect to the second mold half 20 by cooperation with a central die plug 90 secured to the second mold half by the center clamp 50. This central die plug 90 has a generally cylindrical shape projecting upwardly into and through the mold cavity 25 for close reception into a matingly-shaped cylindrical recess 91 formed centrally in the lower face 85 of the dispersion head 72. According to the invention, the die plug 90 has a cross-sectional size and shape corresponding with the size and shape of the desired central aperture 17 to be formed in the information disc 13. The die plug 90 thus cooperates with the dispersion head, when the mold cavity is closed, to mold the central aperture 17 directly into the information disc. Conveniently, the upper peripheral edge 92 of the die plug 90 is beveled for smooth, guided reception into the dispersion head recess 91.

When the mold cavity 25 is closed, the injector gun assembly is operated in a suitable manner to supply molten disc-forming material to the hot sprue assembly 12. This material is injected under relatively high pressure on the order of several thousand psi through the sprue bushing bore 68 and further between the bushing and dispersion head conical faces 70 and 74 to the annular gate 80. The molten material passes through the gate 80 and into the mold cavity 25 to fill and pack the mold cavity with the disc-forming material. As soon as the mold cavity is filled and packed as desired, the injector gun assembly is controlled to relieve substantially the pressure applied to the material, and liquid coolant is circulated through the flow passages 35 and 38 to cool the material within the mold cavity to a solidified state to form the molded information disc.

Cooling of the material within the mold cavity 25 is continued until the material is substantially fully solidified whereupon the mold cavity can be opened by separation of the mold halves 14 and 20 to permit removal of the solidified disc 13 from the machine. However, according to the invention, this cooling of the material is controlled closely to permit solidification substantially up to the annular gate 80 without substantial solidification of disc-forming material remaining within the hot sprue assembly.

More particularly, the heater device 64 at the upper end of the sprue bushing shank 54 provides a source of heat energy which is transferred to the sprue bushing and further to the dispersion head 72 to create and maintain a controlled temperature differential between the sprue assembly 12 and the mold cavity 25 during the solidification process. As illustrated in FIG. 2, the sprue assembly includes heat transfer means of high thermal conductivity for efficiently transferring the heat energy to the dispersion head 72. These heat transfer means are advantageously provided in the form of thermal pins or cartridges 93 each received upwardly and snugly within a hole 94 formed within the dispersion head 72 to extend through an associated spacer flight 75 and further upwardly into an aligned hole 95 in the sprue bushing 52. Set screws 96 are conveniently threaded into the lower ends of the holes 94 to lock the cartridges in position.

The thermal cartridges 93 are selected from a material or materials having a thermal conductivity substantially greater than the thermal conductivity of the sprue bushing 52, whereby the cartridges efficiently transfer heat energy from the upper end of the sprue bushing downwardly to the dispersion head. While these cartridges can be constructed from a variety of materials, one preferred construction comprises a hollow copper tube filled with a highly heat-conductive rarified gas, such as, for example, a so-called thermal pin of the type manufactured and sold by the Kona Corporation of Gloucester, Mass.

The heat energy input of the heater device 64 is closely controlled to correspondingly control the temperature of the dispersion head 72 to permit soldification of the material within the mold cavity substantially up to the gate 80 without substantial solidification of material within the sprue assembly. In operation of the molding apparatus, this requires the heater device 64 to be controlled such that the boundary between physical states of the material, namely, solidified material within the mold cavity and molten material within the sprue bushing is located substantially at the gate 80. As soon as this desired solidification has occurred, the two mold halves 14 and 20 can be separated to open the mold cavity 25 and to expose the solidfied disc 13 for removal from the machine.

The narrow annular gate 80 provides a sharply defined separation point between the mold cavity 25 and the sprue assembly 12 which permits the mold halves to be opened without significant disruption of the surface of the disc 13 in the vicinity of the gate. That is, when the material within the mold cavity solidifies up to the gate, the gate can be withdrawn from the solidified disc without undue disruption of the disc surface. If the physical state boundary is located precisely at the gate, the portion of molten material within the sprue assembly in the vicinity of the gate tends to have a temperature relatively close to solidification temperature, resulting in a relatively high material viscosity to prevent drooling from the gate when the mold halves are opened. Alternately, if the physical state boundary is slightly above the gate, the plastic disc-forming material tends to fracture relatively cleanly at the narrow gate when the mold halves are opened to leave a thin film of solidified material within the sprue assembly sealing the gate against drooling. In either event, the gate 80 is recessed slightly into the disc such that any slight surface discontinuity arising from opening of the mold halves is recessed below the general plane of the disc where it does not interfere with or impair normal use. Conveniently, any such discontinuities are advantageously positioned near the disc central aperture 17 where they are readily covered from view by subsequent application to the disc of a standard identification label.

After extraction of the solidified disc 13 from the apparatus, the mold halves 14 and 20 are again closed to define the mold cavity 25. The injector gun assembly is again operated to inject molten disc-forming material through the sprue assembly and into the mold cavity to form a subsequent information disc 13. To the extent a thin film of solidified material may have remained in the sprue assembly sealing off the gate 80, such film is of insufficient thickness to withstand the injection pressure applied by the injector gun assembly. Accordingly, the thin solidified film is forced through the gate into the mold cavity where it remelts, remixes, and rehomogenizes with the remainder of the material injected into the mold cavity. Following injection, the mold cavity is again cooled to solidify the material up to the gate without substantial solidification within the sprue assembly, whereupon the mold halves are separated, the disc is removed, and the cycle is repeated.

Precise control of the heat input provided by the heater device 64 can be obtained by measurement of the temperature of the disc-forming material within the mold cavity 25 adjacent the gate 80. To this end, a temperature sensing transducer 97 can be installed within a passage 98 in the sprue bushing mounting block 56, and this transducer 97 includes a sensing face 99 lining the mold cavity adjacent the gate. From a knowledge of the solidification characteristics of the particular disc-forming material, this transducer 97 can be calibrated to provide a signal on a conductor 100 which can extend away from the transducer through openings 102 in the first mold half for connection to an appropriate controller (not shown) for the heater device 64. This signal can be utilized to control the temperature gradient between the sprue assembly and the mold cavity for solidification of the material in the cavity up to the gate.

Additional controlling devices can also be provided to control operation of the molding apparatus. For example, additional transducers may be mounted upon the sprue bushing or elsewhere for sensing the pressure of the material within the mold cavity. Such a pressure sensitive transducer can be used, for example, to provide a control signal to the injector gun assembly for indicating satisfactory filling and packing of the mold cavity.

Figure 5:
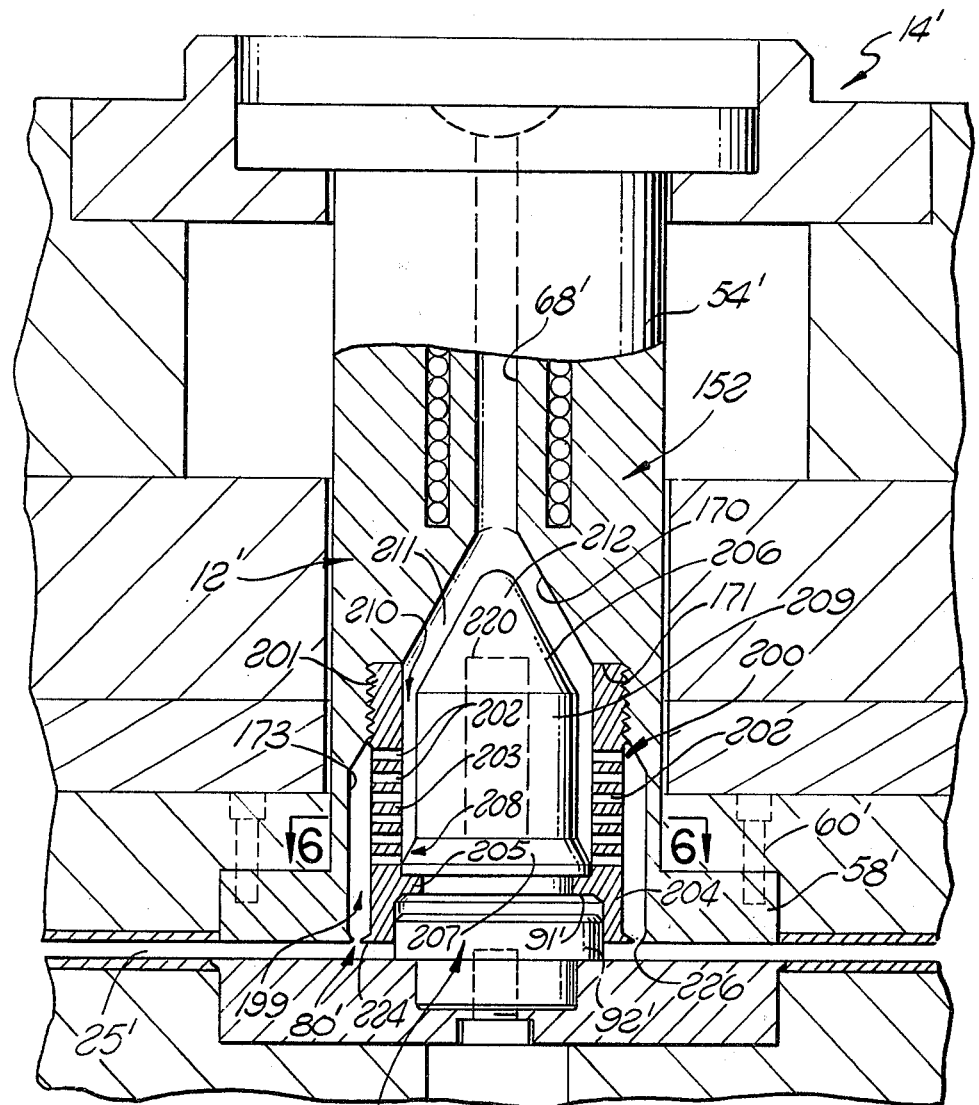
FIG. 5 is an enlarged fragmented cross-sectional view illustrating an alternative preferred form of the hot sprue assembly of this invention.
Figure 6:
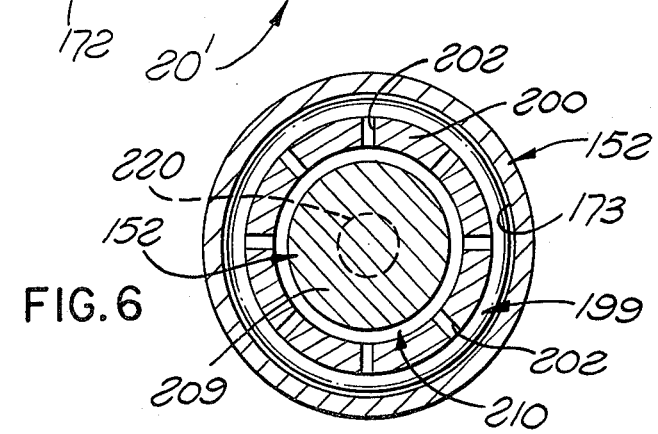
FIG. 6 is an enlarged fragmented horizontal section taken generally on the line 6—6 of FIG. 5.

An alternative form of the hot sprue assembly is illustrated in FIGS. 5-6 wherein components identical to the embodiment of FIGS. 1-4 are designated by common primed reference numerals. As illustrated, the modified hot sprue assembly 12' comprises a sprue bushing 152 having an elongated cylindrical upper shank 54' with a bore 68' formed therein for downward passage of molten disc-forming material which can be injected thereinto by an injector gun assembly (not shown), generally in the same manner as described with respect to FIGS. 1-4. This sprue bushing 152 includes a radially enlarged lower mounting block 58' to facilitate securing thereof to a first mold half 14' as by use of screws 60'.

The sprue bushing 152 is desirably associated with heating means such as a ceramic clamping collar encasing an electrical resistance heater element (not shown in FIG. 5) of the type illustrated in FIG. 2. Alternately, other types of heating means can be used such as an electrical resistance heater coil encased within the shank 54' of the bushing. In any event, the heating means provides heat energy to control the temperature level and resultant molten state of the disc-forming material injected through the sprue bushing bore 68' to maintain this material in a molten state as it passes toward a mold cavity 25'. This mold cavity 25' is defined by the first mold half 14' in conjunction with a second mold half 20' when the two mold halves are moved in a well-known manner into bearing engagement with each other. When the mold halves 14' and 20' are so positioned, molten disc-forming material can be injected into the mold cavity 25' and solidified or frozen to form an information disc 13' having the desired surface discontinuities formed thereon.

The injected disc-forming material flows downwardly through the sprue bushing bore 68', as viewed in FIG. 5, and enters an enlarged and downwardly open conical recess or chamber defined by a downwardly diverging conical face 170 formed within the sprue bushing 152. This conical face 170 merges at its lower extent with an axially downwardly presented shoulder 171 formed at the upper end of an enlarged bore 173. Importantly, an upper portion of this bore 173 is internally threaded to provide a mounting means for a modified dispersion head 172 which cooperates with the sprue bushing 152 to define a prescribed combination of flow paths for the molten material between the bushing bore 68' and the mold cavity 25'.

The modified dispersion head assembly 172 comprises, in its preferred form, an extrusion head constructed generally in accordance with the pipe extrusion head manufactured and sold by NRM Corporation under the name "Gaugemaker Die". More particularly, the modified dispersion head assembly 172 includes a cylindrical extrusion sleeve 200 which has an externally threaded upper portion 201 for threaded reception into the threaded bore 173 of the sprue bushing 152 with the upper axial end of the sleeve in snug, sealing engagement with the shoulder 171 on the bushing. Below the threaded portion 201, the extrusion sleeve 200 has a perforated central portion 203 to include a relatively large number of extrusion passages 202 which are defined by an array of relatively small and relatively closely spaced holes through the sleeve. These extrusion passages, which typically have a size on the order of about 0.020 to about 0.060 inch, open in a radial direction for extrusion passage of the molten disc-forming material, as will be described herein in more detail.

The extrusion sleeve 200 further includes an imperforate lower portion 204 which projects downwardly toward the mold cavity 25' and has an outer diameter sized for cooperating with the sprue bushing 152 to define a relatively narrow annular flow path 199. As shown, this sleeve lower portion 204 includes an internal and inwardly radiating flange 205 for supporting a contoured dispersion head 206. This contoured dispersion head 206 cooperates with the extrusion sleeve 200 and the sprue bushing 152 to force the disc-forming material through the extrusion passages 202 in the sleeve.

More particularly, the dispersion head 206 includes a generally cylindrical base 207 sized for seated and substantial self-centered positioning upon the support flange 205. If desired, this base 207 can be secured rigidly to the flange. From the base 207, the dispersion head tapers upwardly and radially inwardly, as illustrated in 208, toward an upstanding lower cylindrical portion 209 of substantially uniform cross section. This lower cylindrical portion 209 is sized with respect to the extrusion sleeve 200 to define therebetween a relatively narrow annular flow path 210. The upper extent of this flow path 210 merges with the lower extent of a downwardly expanding annular flow path 211 defined between the sprue bushing conical face 170 and a conical upper portion 212 of the dispersion head 206.

In operation, the molten disc-forming material is injected downwardly through the sprue bushing bore 68' against the dispersion head 206. The upper conical portion 212 of the dispersion head divides the material into an annular, downwardly expanding flow stream within the flow path 211. The injected material travels further downwardly into the annular flow path 210 from where the material extrudes under the injection pressure through the extrusion passages 202 formed in the extrusion sleeve. This extruded molten material then enters the outer annular flow path 199 for further travel downwardly toward the mold cavity 25'. Importantly, the large number of small extruded portions of the molten material exiting the extrusion passages 202 tend to remix relatively turbulently with each other within the outer flow path 199, resulting in a highly homogeneous remixing of the material prior to entry into the mold cavity to prevent formation of undesirable "witness" or "knit" lines in the molded product.

The lower portion 204 of the extrusion sleeve 200 includes a lower, peripheral edge 224 which cooperates with the adjacent, annularly spaced edge 226 of the sprue bushing 152 to define a narrow annular gate 80' opening from the outer annular flow path 199 into the mold cavity 25'. This gate 80' is generally identical to the gate shown and described with respect to FIGS. 1-4. More particularly, the gate 80' is geometried to be recessed slightly below the upper general plane of the disc 13' being molded to prevent formation of any surface discontinuity above the general plane of the disc. Moreover, the gate is adapted, with proper control of the temperature gradient between the mold cavity and the sprue bushing, to provide an annularly narrow boundary for the physical states of solid material within the mold cavity and molten material within the sprue assembly. Accordingly, the sprue assembly of this invention permits a high production rate of high quality discs 13' without requiring moving valve parts as a portion of the sprue assembly.

As viewed in FIG. 5, the support flange 205 and the extrusion sleeve 200 cooperate to define a downwardly open, cylindrical recess 91' for reception of the upper end of a central die plug 90' when the mold halves are closed as shown. This die plug has a generally circular outer periphery positioned within the mold cavity 25' to mold a central aperture 17' of the desired size directly into the disc as the disc is formed, in generally the same manner as described with respect to FIGS. 1-4.

Accordingly, the embodiment of FIGS. 5-6 effectively controls injection of disc-forming molten material into a mold cavity in the absence of moving valve parts. This flow control is achieved by use of appropriate temperature gradient control between the sprue assembly and the mold cavity. If desired, the control over temperature can be enhanced by forming the dispersion head 206 to be hollow for reception internally of a heater element 220 such as a so-called thermal pin or an electrical resistance heater, illustrated in dotted lines in FIG. 5, for increasing the heat flow to the dispersion head 206 in the vicinity of the extrusion passages 202 and the gate 80'.

The hot sprue assembly of this invention thus provides substantial improvements over hot sprue assemblies of the prior art by providing simplified apparatus and method for controlling flow of molten material into a mold cavity without requiring any moving valve parts or valve actuation devices. Moreover, the hot sprue assembly of this invention advantageously provides a simplified structure for molding a central aperture directly into an information disc prior to solidification of the disc-forming material.

Various modifications and improvements to the invention described herein are believed to be apparent to one skilled in the art. Accordingly, no limitation upon the invention is intended, except by way of the appended claims.

What is claimed is:

1. In an injection molding machine for producing centrally apertured record discs, apparatus for controlling flow of molten disc-forming material into a disc-shaped mold cavity, comprising:
   a sprue assembly forming an open and relatively narrow gate for passage of the molten disc-forming material into the mold cavity, said gate being disposed in a plane recessed slightly from the general plane of the disc to be formed within the mold cavity;
   said sprue assembly including a sprue bushing having a central bore formed therein for passage of the molten disc-forming material toward the mold cavity, and dispersion means having a plurality of relatively small extrusion passages formed therein, said dispersion means being mounted generally within the end of said bore adjacent said mold cavity for passage of the molten disc-forming material through said extrusion passages prior to passage through said gate; and
   heater means for controlled elevation of the temperature of said sprue assembly to create a preselected temperature gradient between said sprue assembly and the mold cavity for permitting solidification of the disc-forming material within the mold cavity up to the gate without substantial solidification of disc-forming material within said sprue assembly.

2. The apparatus of claim 1 wherein said gate is generally annular in shape.

3. The appartus of claim 2 wherein said annular gate has a radial width of on the order of from about 0.005 inch to about 0.020 inch.

4. The apparatus of claim 2 wherein said gate is defined by an annular space between said sprue bushing and said dispersion means adjacent the mold cavity.

5. The apparatus of claim 1 wherein said sprue assembly further includes means positioned within the mold cavity for molding a central aperture into the disc prior to solidification of the disc-forming material.

6. The apparatus of claim 1 wherein said dispersion means cooperates with said sprue bushing to define a first annular chamber for receiving the molten disc-forming material, and a second annular chamber communicating with said gate, said extrusion passages permitting flow of the material from said first annular chamber into said second annular chamber.

7. The apparatus of claim 6 wherein said dispersion means comprises a generally cylindrical sleeve having said plurality of extrusion passages formed therein.

8. The apparatus of claim 7 wherein each of said extrusion passages has an opening diameter on the order of from about 0.020 to about 0.060 inch.

9. The apparatus of claim 7 wherein said sleeve comprises a radial boundary between said first and second annular chambers, and wherein said second annular chamber is relatively narrow and has an axial length sufficient to permit rehomogenization of the material into a single annular flow stream prior to passage through said gate.

10. The apparatus of claim 1 wherein said sprue bushing is oriented with its central bore extending generally along a central axis of the mold cavity.

11. The apparatus of claim 1 wherein said heater means is mounted for supplying heat energy to the end of said sprue bushing generally opposite the mold cavity.

12. The apparatus of claim 1 wherein said heater means comprises a heating element carried within said dispersion means.

13. The apparatus of claim 1 including a first mold half and a second mold half movable with respect to each other between a closed position to define the mold cavity and an open position to permit a molded disc to be removed from the machine, said sprue assembly being mounted on said first mold half for movement therewith, and including a die plug mounted on said second mold half to extend through the mold cavity when said mold halves are closed for cooperation with said disepersion means to mold a central aperture into the disc prior to solidification of the disc-forming material.

14. The apparatus of claim 13 wherein said die plug has a generally cylindrical shape for close reception of its distal end into a matingly-shaped recess formed in said dispersion means when said mold halves are closed.

15. The apparatus of claim 1 wherein said bore in said sprue bushing has a first portion of relatively narrow cross section opening toward the mold cavity into a second portion of increased cross section, said dispersion means being mounted generally within said second portion and including means for dividing the molten material into an annular flow stream prior to passage through said extrusion passages and for recombining the molten material downstream of said extrusion passages into a homogeneous flow stream prior to passage through said gate.

16. In an injection molding machine for producing centrally apertured record discs, a sprue assembly for controlling flow of molten disc-forming material into a disc-shaped mold cavity, comprising:

a sprue bushing having a central bore for passage of the molten disc-forming material toward the mold cavity, said bore opening into a chamber of enlarged cross section extending in a direction toward the mold cavity;

dispersion means positioned generally within said chamber and cooperating with said sprue bushing to define an open and relatively narrow annular gate for passage of molten disc-forming material into the mold cavity, said dispersion means having a plurality of relatively small extrusion passages formed therein for passage of the material prior to passage of the material through said gate; and heater means for creating a preselected temperature gradient between said dispersion means and the mold cavity for permitting solidification of the disc-forming material within the mold cavity substantially up to said gate without substantial solidification of disc-forming material within the sprue assembly.

17. The sprue assembly of claim 16 wherein said sprue bushing and said dispersion means cooperate to form said gate in a plane recessed slightly from the general plane of the disc to be formed within the mold cavity.

18. The sprue assembly of claim 16 wherein said sprue bushing is oriented within its bore aligned generally along a central axis of the mold cavity, and including means positioned within the mold cavity for molding a central aperture into the disc prior to solidification of the disc-forming material, said gate being positioned concentrically about and relatively close to said aperture-molding means.

19. The sprue assembly of claim 16 wherein said annular gate has a radial width of on the order of from about 0.005 inch to about 0.020 inch.

20. The sprue assembly of claim 16 wherein said gate is formed within a relatively shallow annular boss defined by said sprue bushing and said dispersion means to extend slightly into the mold cavity.

21. The sprue assembly of claim 16 wherein said heater means comprises a heat generation device mounted at the end of said sprue bushing generally opposite the mold cavity.

22. The sprue assembly of claim 21 wherein said heat generation device comprises an electrical resistance coil.

23. The sprue assembly of claim 16 wherein said heater means includes a heating element carried within said dispersion means.

24. The sprue assembly of claim 16 wherein said dispersion means includes means for dividing the molten disc-forming material into an annular flow stream upstream of said extrusion passages and means for recombining the material into a homogeneous annular flow stream downstream of said extrusion passages.

25. The sprue assembly of claim 24 wherein said dividing means comprises means forming a relatively narrow annular chamber for receiving molten disc-forming material from said bore for passage into communication with said extrusion passages, and wherein said recombining means comprises means forming a relatively narrow annular chamber for receiving molten disc-forming material from said extrusion passages into communication with said gate.

26. The sprue assembly of claim 16 wherein said dispersion means comprises a generally cylindrical sleeve having one end secured to said sprue bushing generally within said chamber and extending axially toward the mold cavity, said sleeve and said sprue bushing cooperating to define said gate and a relatively narrow annular flow path opening toward said gate, said extrusion passages being formed in said sleeve.

27. The sprue assembly of claim 26 wherein said dispersion means further includes a generally cylindrical dispersion head disposed within said sleeve and projecting in radially spaced relation therewith toward said bore whereby said head and sleeve cooperate to define a relatively narrow annular flow path communicating between said bore and said extrusion passages.

28. The sprue assembly of claim 27 wherein said sleeve includes a radially inwardly projecting flange for supporting said head.

29. The sprue assembly of claim 27 wherein said chamber formed in said sprue bushing has a generally conical surface expanding from said bore in a direction toward the mold cavity, said conical surface merging with a generally cylindrical surface extending toward the mold cavity with a substantially uniform cross section, said dispersion head including a generally conical portion disposed in spaced relation with said conical surface and a generally cylindrical portion disposed in spaced relation with said cylindrical surface.

30. The sprue assembly of claim 26 wherein said one end of said sleeve is threadably secured to said sprue bushing.

31. In an injection molding machine for producing centrally apertured record discs, a sprue assembly for controlling flow of molten disc-forming material into a disc-shaped mold cavity, comprising:

a sprue bushing having a central bore for passage of the molten disc-forming material toward the mold cavity;

means forming a relatively narrow annular gate for passage of the material into the mold cavity, said gate being disposed in a plane recessed slightly from the general plane of the disc to be formed within the mold cavity;

means for dividing the material passing from said bore into a first annular flow stream;

means for extruding said first annular flow stream through an annularly-arranged plurality of relatively small extrusion passages;

means for recombining the extruded material into a substantially homogeneous second annular flow stream and for coupling said second annular flow stream for passage through said gate; and heater means for creating a preselected temperature gradient between said bore and the mold cavity for permitting solidification of the disc-forming material within the mold cavity substantially up to said gate without substantial solidification of disc-forming material upstream of said gate.

32. The sprue assembly of claim 31 including means positioned within the mold cavity for molding a central aperture into the disc prior to solidification of the disc-forming material.

33. In an injection molding machine for producing centrally apertured record discs, a sprue assembly for controlling flow of molten disc-forming material into a disc-shaped mold cavity, comprising:

a sprue bushing having a central bore for passage of the molten disc-forming material toward the mold cavity;

means forming a relatively narrow annular gate for passage of the material into the mold cavity, said gate being disposed in a plane slightly recessed from the general plane of the disc to be formed within the mold cavity;

means forming a relatively narrow and generally axially extending flow path communicating between said bore and said gate;

means forming an annularly arranged plurality of relatively small extrusion passages disposed along the axial length of said flow path, whereby material flowing through said flow path is extruded through said extrusion passages and is recombined into a substantially homogeneous annular flow stream downstream of said extrusion passages; and heater means for creating a preselected temperature gradient between said bore and the mold cavity for permitting solidification of the disc-forming material within the mold cavity substantially up to said gate without substantial solidification of disc-forming material upstream of said gate.

34. The sprue assembly of claim 33 including means positioned within the mold cavity for molding a central aperture into the disc prior to solidification of the disc-forming material.

35. In an injection molding machine for producing centrally apertured record discs, a sprue assembly for controlling the flow of molten disc-forming material into a disc-shaped mold cavity, comprising:

a sprue bushing having a central bore formed therein for passage of the molten disc-forming material toward the mold cavity, said bore including a first portion of relatively narrow cross section opening into a second portion having a cross section expanding in an axial direction toward the mold cavity, said second portion merging with a third portion of generally uniform cross section opening axially toward the mold cavity;

a dispersion head assembly positioned generally within said second and third portions of said bore, said dispersion head assembly including a generally cylindrical sleeve having one end secured to said sprue bushing and extending within said third portion axially toward the mold cavity, said sleeve cooperating with said sprue bushing to define therebetween an axially extending and relatively narrow annular flow path opening toward the mold cavity and terminating in an annularly open gate disposed in a plane recessed slightly from the general plane of the disc to be formed within the mold cavity;

said dispersion head assembly further including a dispersion head disposed within said sleeve and projecting in a direction away from the mold cavity, said dispersion head having a cylindrical portion radially spaced from said sleeve and a conical portion radially spaced from said second portion of said bore for defining a relatively narrow annular flow path communicating between said first portion of said bore and said sleeve, said sleeve having a plurality of relatively small extrusion passages formed therein for passage of the material therethrough; and heater means for creating a preselected temperature gradient between said bore and the mold cavity for permitting solidification of the disc-forming material within the mold cavity substantially up to said gate without substantial solidification of disc-forming material upstream of said gate.

36. The sprue assembly of claim 35 including a first mold half and a second mold half movable with respect to each other between a closed position to define the mold cavity and an open position to permit a molded disc to be removed from the machine, said sprue assembly being mounted on said first mold half for movement therewith, and including a die plug mounted on said second mold half to extend through the mold cavity when said mold halves are closed for reception into a matingly shaped recess formed in said dispersion head assembly to mold a central aperture into the disc prior to solidification of the disc-forming material.

* * * * *